Patented June 1, 1926.

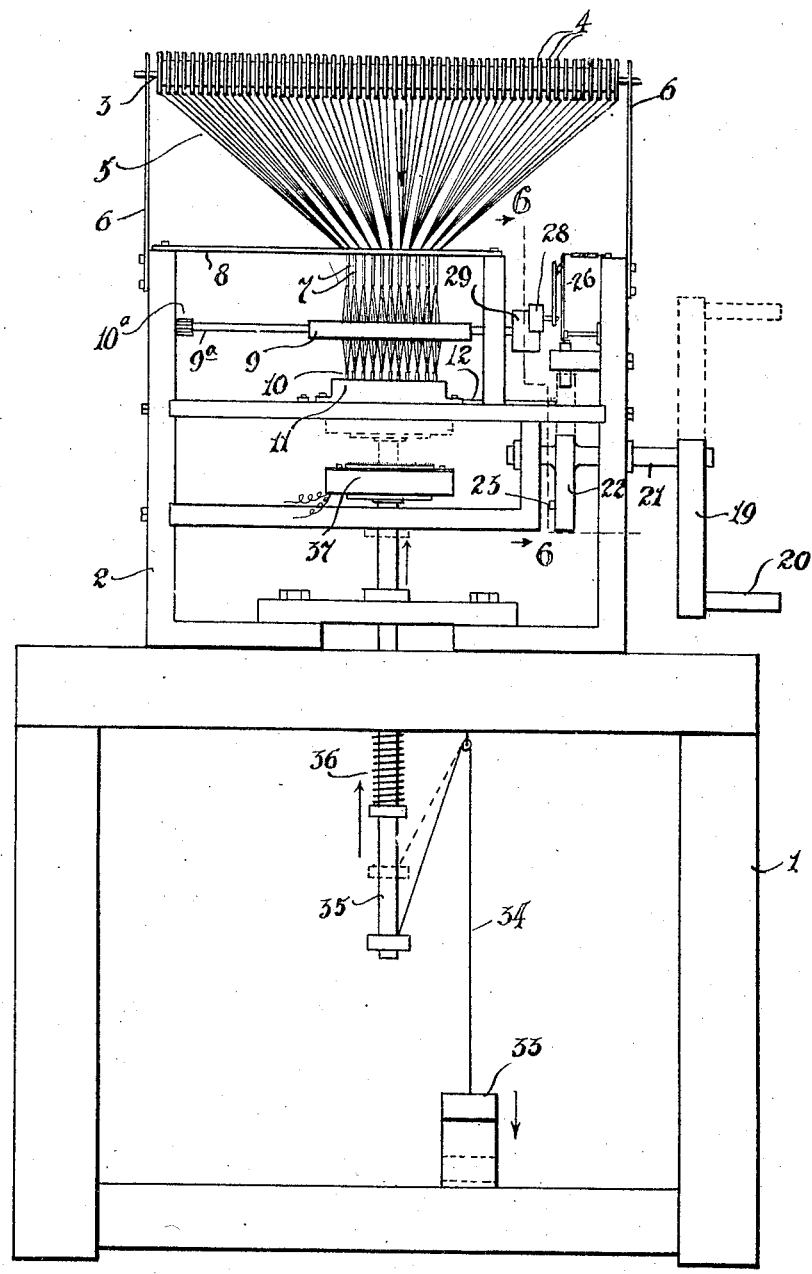

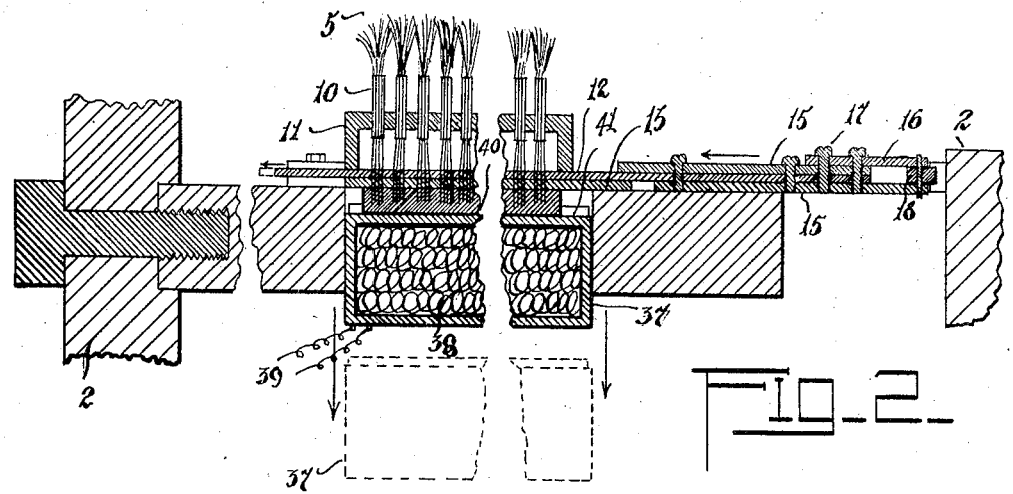

1,587,237

UNITED STATES PATENT OFFICE.

CHARLES C. McCOMBS, OF SHERMAN, TEXAS, ASSIGNOR OF ONE-THIRD TO W. R. DUFFEY, OF FORT WORTH, TEXAS, AND ONE-THIRD TO JOHN D. KILLOUGH, OF STEPHENVILLE, TEXAS.

MACHINE FOR MAKING CHECK PROTECTORS.

Application filed April 20, 1925. Serial No. 24,431.

This invention relates to improvements in check protectors and in such connection it relates more particularly to a machine for manufacturing check protectors of a type for which application for Letters Patent has heretofore been made on the 23rd day of February, 1925.

The present invention comprises an arrangement of parts whereby a plurality of wires of very small diameter are placed in vertical formation and cut to resemble letters, symbols and the like and firmly and permanently fixed in a composition in a tray, the latter to be arranged in the check protector above referred to.

A particular object of the invention is the means employed in fixing the wires in vertical formation in the tray or support against their movement or dislocation and for the arrangement of the means in the machine for accurately cutting the wires after they are assembled to form the letters, figures or symbols.

Another object and feature of the invention is that the trays containing the wires and forming the essential part of the invention may be turned out rapidly and accurately by the machine, the latter having comparatively few parts.

With the above and other and further objects in view, the invention will be more fully understood by reference to the following description, in connection with the accompanying drawings, forming part hereof and in which:

Figure 1 is a front elevational view of the machine with parts thereof shown in dotted lines to illustrate the operative positions thereof.

Figure 2 is a longitudinal sectional view through the upper part of the machine.

Figures 3 and 4 are top views of the shearing plates used in the machine to cut the wires into pins.

Figure 5 is a top view of the wires embedded in a tray, ready to be assembled into a check protector.

Figure 6 is a vertical sectional view of the machine taken on line 6—6 of Figure 1.

Figure 7 is a fragmentary top view of one of the shearing plates and the means for retracting the plate to normal position.

Continuing the description of the invention and referring to its various parts more in detail, the machine has a support 1 for a frame 2, the latter enclosing the main working parts. At the top of the frame 2 is a reel 3 with spaced members 4—4 for maintaining the wires 5 in proper spaced relation to permit them to be fed through the machine in the direction of the arrow. This reel is revolubly mounted on two uprights 6—6. As will be seen the wires are drawn together and inserted into tubular members 7—7 seated on a support 8. After passing through these tubular members the wires are spread apart between a pair of rollers 9 on rods $9^a$ with spur gears $10^a$ and are again drawn together and made to enter the tubes 10—10. These tubes are set in the top of a box 11 secured to a cross-member of the frame.

Secured to the frame 2 is an upper reciprocating shearing plate 12 and a lower stationary shearing plate 13, illustrated in detail in Figures 3 and 4. Both plates have apertures 14—14 for fastening them in operative position, the plate 12 being secured between two plates 15—15 and 16 by the bolts 17. One of the lower plates 15 and the lower plate 16 are in turn fastened to an operating member 18. Each plate 12 and 13 has a series of very small perforations $12^a$ in the form of figures or other symbols, those perforations in plate 13 being somewhat larger than those in the upper plate, so that the wires will pass downward more freely without striking the sides of the perforations when the plates are in alinement.

The means employed for operating the shearing plates is provided for by a crank arm 19 with a handle 20. This arm operates to rotate a rod 21 with a cam 22, and has a projection 23, the latter adapted to be moved against the end of the member 18 when the crank is in the dotted line position shown in Figure 1.

The wires are fed downward between the rollers as the crank arm is moved by the cam 22 against a finger 23. This finger is shown in Figure 6 and is so arranged that it will move upward on its support 24 in the dotted line position and will move by means of the bars 25, 26 and 27 a small clutch 28 and a wheel 29, the latter being connected to the rollers 9. By this means the wires are pulled and fed downward at each rotation of the crank arm 19 and the reciprocating shearing plate 12 is simultaneously moved against the wires to sever them. Since the plates 12 and 13 are in close contact and have knife edges the wires are cut neatly and quickly, the movement of the arm 19 exerting a pressure of approximately 100 pounds. When the plate 12 reaches the end of its stroke it strikes a bar 30 with a small projection 31 under spring tension and returns the plate 12 to normal position, the plate traveling between the slides 32—32.

Reference being had to Figures 1 and 2, in the lower part of the machine is a foot treadle 33 connected to a cord 34, attached to a bar 35 under spring tension 36 and arranged to moved the bar upward. This bar carries a box 37 containing wires 38 connected into an electric circuit from the leads 39. This is for the purpose of heating a material in a tray such as sealing wax or any suitable material 40 carried in a tray 41 into which the wires are embedded when the wax or composition has cooled.

In the operation of the machine, the wax or base for supporting the wires (or properly pins after they are cut) is placed in the tray 41 and the treadle worked to move the box upward to receive the wires, the current being previously turned on to heat the composition. The current is then cut off and the handle 20 of shaft 21 rotated which will draw the wires downward into the wax. The wax cools quickly and the shearing plates now sever the wires leaving the pins 42 appearing in the form of the figures as indicated in Figure 5. In the feeding of the wires downward the operation is such that as soon as the wires reach the bottom of the tray through the composition the clutch will slip and this prevents the wires from buckling and maintains them in a perfect upright taut position during the severance thereof.

It should be understood that modifications may be made in the construction of the machine in keeping with the following claims:

1. In a machine of the class described, a base, a frame, shearing plates in the frame, said plates provided with perforations in the form of figures and symbols, means for directing wires through said plates to project the wires into trays and means for actuating the plates to sever the wires into pins and to secure the pins rigidly in place in said trays.

2. A machine as described comprising a frame supported on a base, a reel carrying wires, a reciprocating rod carrying a heater box, means for reciprocating the box in the base and frame, means on the box carrying a composition into which the wires are inserted while the composition is heated, and means for severing the wires into pins to project from the composition.

3. A machine as described comprising a base, a frame, a reciprocating rod traversing the base and frame, a heater box thereon, means for reciprocating the rod; shearing blades with perforations in the form of letters and symbols a plurality of wires arranged above the frame, means for simultaneously feeding the wires through the apertures in the plates; means for actuating the plates to shear and cut the wires into pins; said heater box carrying trays containing a composition for permanently fixing the pins in position in the formation of the letters, figures and symbols when the composition has cooled.

4. In a device of the character described, a frame mounted on a base, a pair of perforated shearing plates mounted in the frame, means for actuating one of said plates to sever wires passed through the perforations therein, and means to secure such severed portions of said wires rigidly in trays.

5. The method of affixing wires into a composition consisting of inserting the wires into the composition through perforations in a pair of shear plates, then allowing said composition to solidify and then actuating one of said shear plates to sever said wires.

In testimony whereof I have signed my name to this specification.

CHARLES C. McCOMBS.